Figure 14:
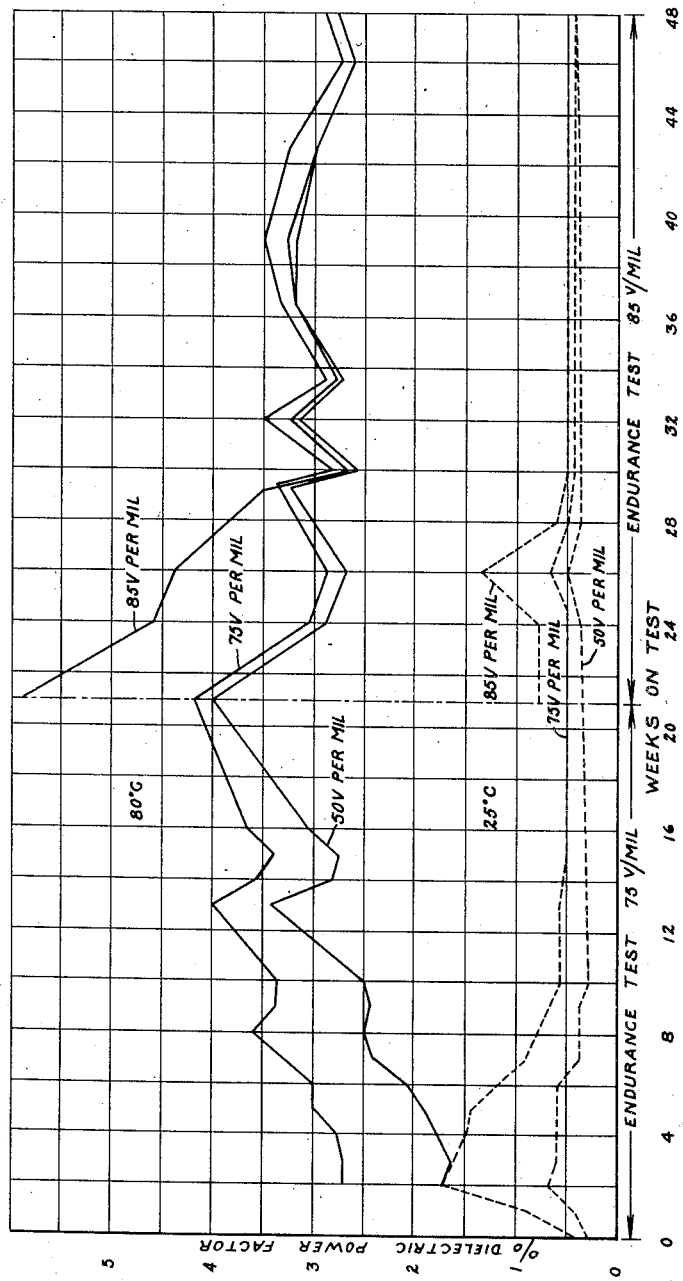

Aug. 26, 1941.  G. B. SHANKLIN  2,253,984
GAS FILLED CABLE AND METHOD OF MAKING THE SAME
Filed Aug. 10, 1938  4 Sheets-Sheet 1
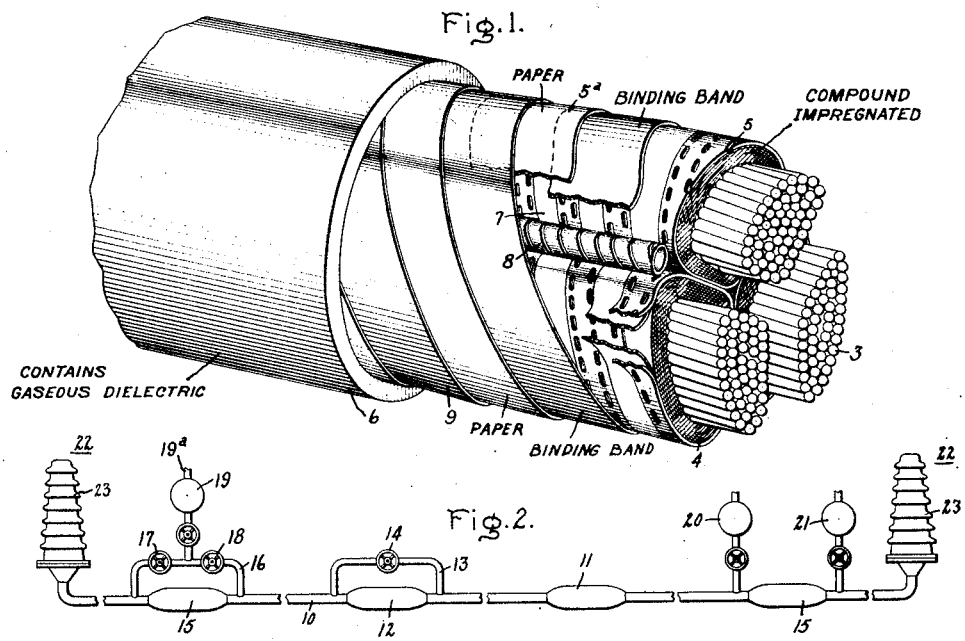
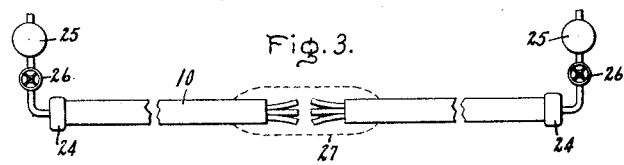
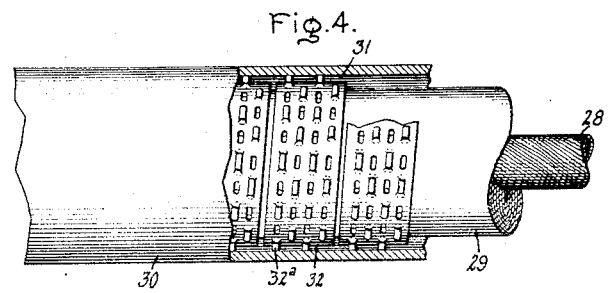
Inventor:
George B. Shanklin,
by Harry E. Dunham
His Attorney.

Aug. 26, 1941.    G. B. SHANKLIN    2,253,984
GAS FILLED CABLE AND METHOD OF MAKING THE SAME
Filed Aug. 10, 1938    4 Sheets-Sheet 2
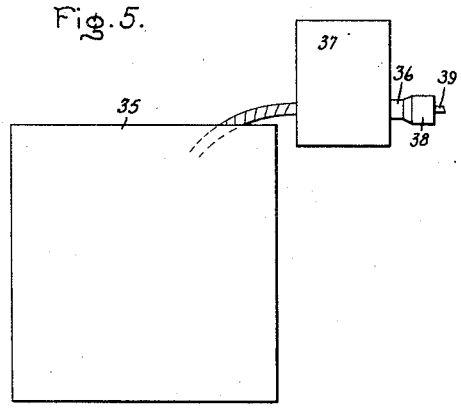
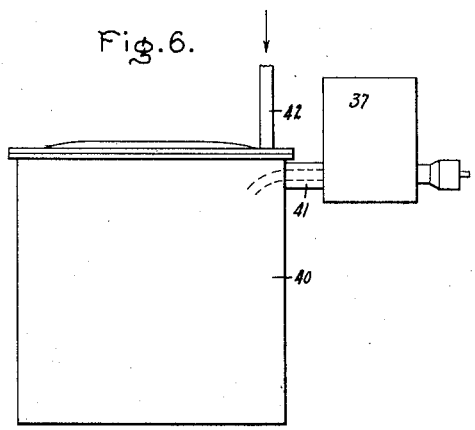
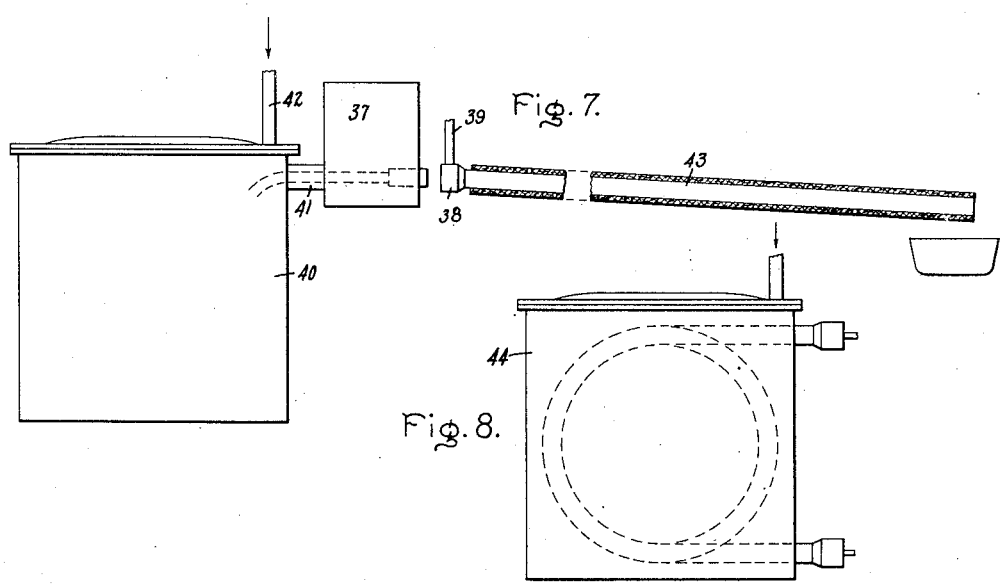
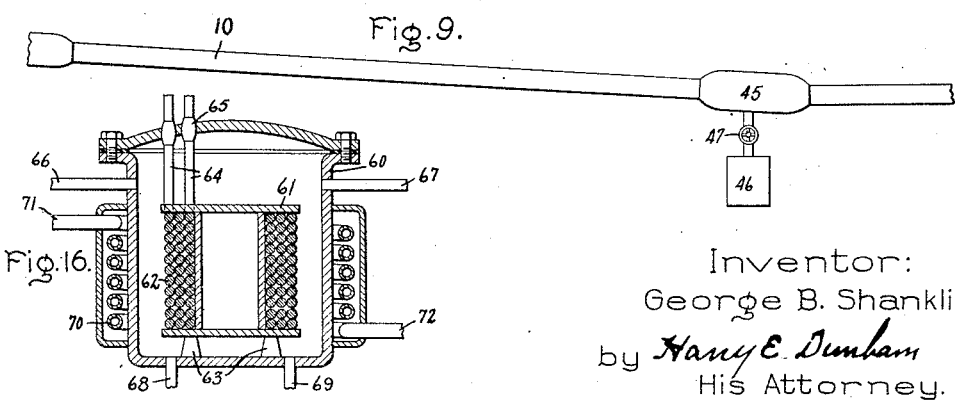
Inventor:
George B. Shanklin,
by Harry E. Dunham
His Attorney.

Aug. 26, 1941.  G. B. SHANKLIN  2,253,984
GAS FILLED CABLE AND METHOD OF MAKING THE SAME
Filed Aug. 10, 1938  4 Sheets-Sheet 3
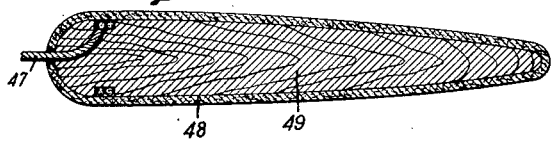
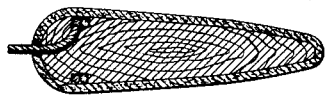
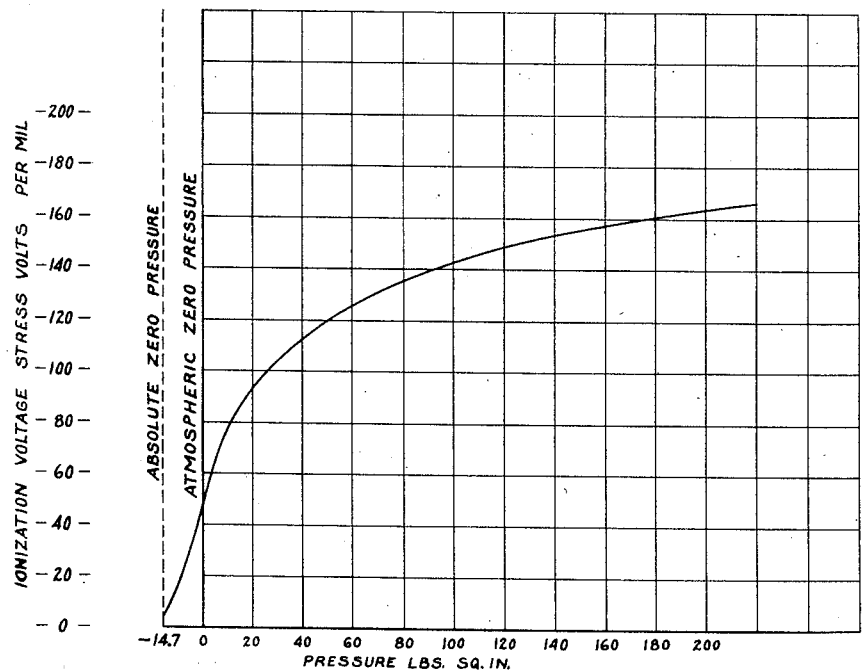
Inventor:
George B. Shanklin,
by Harry E. Dunham
His Attorney.

Aug. 26, 1941.   G. B. SHANKLIN   2,253,984
GAS FILLED CABLE AND METHOD OF MAKING THE SAME
Filed Aug. 10, 1938   4 Sheets-Sheet 4

Inventor:
George B. Shanklin,
by Harry E. Dunham
His Attorney.

Patented Aug. 26, 1941

2,253,984

UNITED STATES PATENT OFFICE 2,253,984

GAS FILLED CABLE AND METHOD OF MAKING THE SAME

George B. Shanklin, Schenectady, N. Y., assignor to General Electric Company, a corporation of New York Application August 10, 1938, Serial No. 224,170

18 Claims. (Cl. 173—244)

The present application is a continuation in part of my prior application for Letters Patent, Serial No. 94,953, filed August 8, 1936.

It is recognized in the manufacture and use of ordinary so-called solid type electric cables having impregnated fibrous material, such as paper, for insulating the conductor and an enclosing impermeable sheath that even when care is exercised in the manufacture, a small but nevertheless definite amount of gas will remain within the confines of the sheath. In cables impregnated with the utmost care, the amount of contained gas may be reduced to the order of one-half of one per cent of its original volume. In a cable so treated, the residual gas initially is in solution in the impregnating compound, but if during load cycles of the cable when in operation, an appreciable drop in the internal pressure occurs at any point in the cable cross section, the gas will pass out of solution and appear as small bubbles at this point due to shrinkage of impregnating compound. Repetition of such cycles permits the bubbles which remain as such to migrate and in so doing to collect and form larger bodies which are a real source of danger since once ionization begins, it is liable to continue cumulatively until failure of the insulation occurs. Ionization of gas is largely dependent upon pressure conditions, and of course to electric stresses, especially near the conductor. An ionization curve of a cable containing such gas bubbles or voids shows that a very marked increase in ionization effect takes place as the pressure drops and a marked decrease in such effect as the pressure rises; the decrease, however, is less marked above approximately 15 to 20 pounds. In other words, a good part of the improvement is obtained at relatively low positive pressures of this order.

It is well known that voids form in ordinary solid type paper insulated cable and that ionization in these voids causes deterioration and frequently leads to serious failures. As a result of a number of years of study of this ionization phenomena, accompanied by practical experience, I have ascertained that cumulative deterioration damage leading to failure is far more pronounced when such cable is at low temperature than at high temperature, the reason being that the gas spaces or voids are not only larger but under negative pressure, i. e., partial vacuum at low temperature. This leads to more pronounced ionization discharge which in turn causes chemical disintegration of the impregnating compound. The by-products of this disintegration are "X" wax, hydrogen, carbon dioxide and similar gases, water, acids and other conducting impurities. The evolution of harmful gases and conducting impurities is very pronounced at low and subatmospheric pressures and causes ionization damage to spread by pushing compound away from a given area or areas leaving what may be termed "dry spots" in the insulation. In other words, ionization damage under negative pressure conditions is cumulative in its action and the cable eventually reaches a state of deterioration when service failure occurs.

It has been proposed, especially in Europe, to reduce ionization effects in high potential cables such as 132,000 volts, for example, by subjecting the insulation thereof to very high gas pressures as of the order of 150 to 200 pounds per square inch. Such pressures require either that the sheath be specially constructed with very strong and special reinforcing means to prevent bursting or that the cable be located within a strong steel or other pipe to which gas is admitted so as to act to compress the sheath and through it the insulation. Cables operating with such high gas pressures can only be justified economically when they are designed to carry large amounts of power at very high potentials. The reason for this is the high cost of the pipe, the compressors, and the necessary auxiliary devices. The cost of installing and of maintaining the system, especially in the prevention of leaks, is also an item of heavy expense. Reports have come to my attention indicating that in practice such cables are not, for various reasons, meeting with the success that was claimed for them and, at least in one installation, resulted in complete failure.

As a result of exhaustive experiments and tests covering several years and entailing a heavy expense, I have ascertained as a result thereof that low gas pressures of the order of 15 to 20 pounds may effectively be employed to minimize ionization effects in single and multi-core cables, provided the cable is properly constructed and has one or more free and reasonably unrestricted gas feed channels and provided further that it is operated at moderate potentials, and this with lead or equivalent sheaths of ordinary construction, also that such a cable may economically be used as a substitute for and take the place of the ordinary solid type cable in the voltage range in which such solid type cable is usually employed. The cost of such cable both from the viewpoint of initial cost and of installing and operating expense is economically justified, and in addition will be free from the troubles now confronting users of solid type cable and specifically from failures due to accumulative ionization damage, split lead sheaths, entrance of air and moisture at points of accidental leakage, and similar troubles so commonly encountered with solid type cable and recognized to be due to wide pressure fluctuations in the cable and lack of pressure control.

As the result of my investigation mentioned above, I have ascertained that a surprising gain in ionization stability is obtained in the first 15 pounds gauge pressure increase above atmosphere and that above this pressure, the benefits thereof fall off very rapidly. This increase in the benefits is accomplished by a much more rapid increase in cost because of the necessity of providing expensive and special reinforcement or even a steel pipe container for the cable when the gas pressures become relatively high. Tests made on suitably constructed cable, as hereinafter described, having one or more free and relatively unrestricted longitudinally extending channels with gas pressures maintained therein at from 10 to 15 pounds gauge show that the tendency toward cumulative deterioration from ionization discharge is actually reversed and instead of a cumulative action, there is a self healing, self extinguishing action that eventually caused ionization to disappear at any given voltage stress. It has for years past been the prevailing opinion among skilled cable engineers that so-called "X" wax, found in many cables, is the basis for the progressive increase in the dielectric loss in cable insulation. In fact the formation of "X" wax by ionization discharge in a cable has been regarded as synonymous with cable deterioration and ultimate failure. The reason "X" wax has always been associated with cable deterioration is because in the past, it has been considered only in connection with ordinary solid type cable where ionization is of a progressive accumulative nature leading to ultimate failure. This is due to the fact that there is no control whatsoever of pressure in a solid type cable and the accumulative effect of ionization takes place when the cable is operating at its lowest temperature and under negative pressure. Under these conditions, ionization discharge occurs readily and at relatively low voltage stress. The discharge disintegrates the impregnating compound forming a number of by-products in addition to "X" wax. It is these by-products which include hydrogen and other gases that lead to accumulative action. The gases so formed tend to push the compound out of the way, and this leads to additional ionization and further evolution of the gas and in conducting impurities. The damage gradually travels through the insulation thickness until failure occurs. Notwithstanding the foregoing, I have determined by electrical tests that under gas pressures of from 10 to 15 pounds the action of the "X" wax is beneficial, not harmful, and that the self healing effect referred to above is due in fact to the formation of the "X" wax in the voids or internal spaces without the formation of harmful conducting by-products, such as water and acids. The gas pressure applied through free unrestricted channels cause the wax gradually to fill up the voids or spaces and this in turn causes ionization to disappear and the cable to remain stable without further signs of deterioration and without failure in service. Stated another way, I have discovered that the self-healing effect is produced by increasing the gas pressure from a negative value to a few pounds positive pressure and thereby obtain much greater assurance against deterioration and failure in service. Ionization in the gas pressure cable of my invention is different in its action from that in solid type cable for the reason that the parts within the sheath are always maintained under controlled positive pressure as distinguished from uncontrolled variable pressure occasioned by change of operating temperature of the cable and that of the surrounding material. The by-products in my improved cable are also different, and obviously conducting impurities are not formed since exhaustive tests show that there is no appreciable increase in dielectric power factor as would otherwise be the case. This gives the "X" wax a chance to show its beneficial nature by completely or partly filling up the localized voids in which the incipient discharge occurs. The incipient ionization discharge is strictly confined to these localized voids and for that reason does not gradually push its way through the insulation thickness. This explains the self-healing effect which leads to final extinguishing of the ionization discharge before harm is done to the cable. By using low pressure gas of the value stated, the cable sheath does not require reinforcement of any kind although it may be used whenever desirable or necessary, and the cable can be reeled, unreeled and pulled into underground ducts through manholes by the same means commonly employed for the purpose. This also results in a substantial saving in cost in the cable itself. By using low pressure gas the cost of the accessories required to supply and maintain the gas at the determined pressure is relatively small and very substantially reduced over those required for high pressure gas cable, such for example as pumps, accumulators, fittings, etc.

The above mentioned self-healing effect requires a special art in the design and construction of the cable. Obviously, the smaller the area and the thinner the voids that are formed in the cable structure, the greater is the assurance that self-healing will take place. On the same basis, the smaller the voids, the higher will be the allowable operating voltage. To keep the void spaces at a minimum the insulation, generally in the form of paper tape from ½ inch to 1.0 inch wide and as thin as can be safely handled without tearing, should be applied as compactly and uniformly as possible with the butt edges of the tapes in the same layer as close together as practicable. The paper tapes after being applied to the necessary thickness for the operating voltage are impregnated with a suitable compound which has little or no tendency to bleed or escape radially from the paper, although in some cases the paper may be impregnated with such compound before being wrapped around the conductor or conductors.

An object of my invention is the provision of an improved electric cable for moderate voltage, both of the multi and single conductor type, which is free of objectionable ionization when in service and in which wax formation caused by incipient ionization in localized voids is utilized in cooperation with a neutral gas under superatmospheric pressure within the sheath to fill the localized voids within the body of insulation on the conductor or conductors and prevent cumulative ionization damage.

A further object of my invention is the provision of an improved single or multi-core cable intended to operate at moderate potentials having conductors insulated with fibrous material impregnated with a viscous compound of such film tension that it has little or no tendency to bleed or move radially outward from the insulation under operating conditions, and having an enclosing impervious sheath with a filling of insulating gas contained in one or more free, longitudinally extending channels located in regions within the sheath which are outside of the field of electrical stresses by reason of electrostatic shields applied over the insulation on the conductor or conductors, the gas being under low but sufficient pressure to counteract the tendency toward cumulative deterioration from ionization discharge and cause, by reason of wax formation, a self healing, self extinguishing action that eventually causes ionization to disappear and the cable to remain stable under operating conditions.

Further objects of my invention are improved methods and means of treating the aforesaid cable in the manufacture and installation thereof.

For a consideration of what I believe to be new and my invention, attention is directed to the accompanying description and the claims appended thereto.

Figure 15:
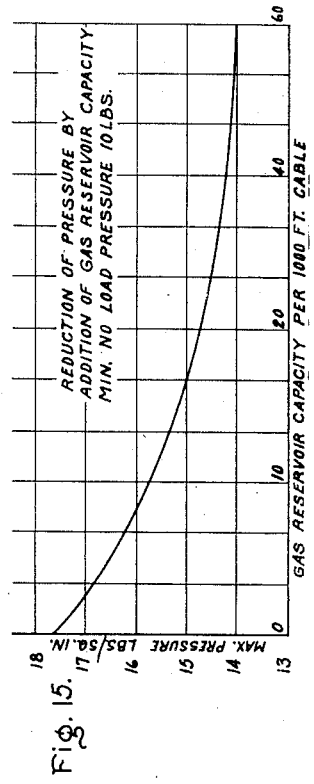
Figure 13:
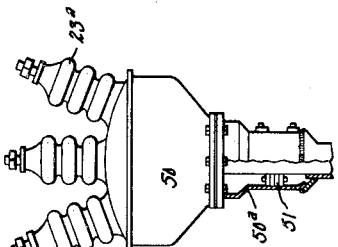

In the accompanying drawings which are illustrative of my invention, Fig. 1 is a perspective view of a three core cable designed to operate three phase; Fig. 2 is a view of several lengths of such cable connected to form a system; Fig. 3 is a detail view showing how gas is applied for jointing the reel lengths; Fig. 4 is a detail view of a cable having a gas channel located between the insulation and the sheath; Figs. 5 to 8 illustrate means for treating the cable during the course of its manufacture; Fig. 9 illustrates a portion of an installation where the cable is inclined for drainage purposes; Figs. 10, 10a, 11 and 11a are enlarged sectional views of temporary plugs for the ends of the free gas channels; Fig. 12 is a curve illustrating voltage stress at which ionization starts in the cable as a function of gas pressure; Fig. 13 is a view of a terminal for a three-conductor cable; Fig. 14 is a reproduction of a chart of long time ionization tests of my improved cable; Fig. 15 is a curve illustrating the pressure conditions of an installed cable, and Fig. 16 is a sectional view of an impregnating tank.

In carrying out my invention, according to Fig. 1, each conductor 3 is covered with fibrous insulation 4 of which paper is an illustration. The paper in the form of thin ribbons or tape is wound in successive layers directly over the conductor to a thickness determined by the potential of the current that the conductor is intended to carry. The tapes should be so applied that the edges of adjacent tapes in the same layer are in butting relation so as to reduce the formation of void spaces as completely as possible. Also that the joints between turns of inner layers are covered by the body of the immediately overlying tape. The smaller the surface area and thickness of the voids, the more certain is the self healing effect and the lesser the gas pressure necessary. Care should be exercised to see that the paper tapes as applied are free from wrinkles, also that the turns of each layer do not overlap because such overlap would necessarily enlarge the voids. Such a covering forms a relatively dense body without free spaces. Over the insulation and making a snug fit thereon is a wrapped on thin perforated metal tape or electrostatic shield 5 which makes electrical contact with similar coverings on the other two cores and also with the inner wall of the lead sheath 6. Since accurate spacing of the turns of each shield is highly desirable to reduce the size of voids, a layer of tough paper tape 5a is interposed between the butts or edges of the turns thereof, one half of each turn of the tape being under one half of a turn of the shield and the other half over the adjacent turn according to the patent of W. C. Hayman 1,751,403 issued March 18, 1930. The use of properly perforated shields permits the compound to enter the paper insulation during the process of impregnation. The purpose of these shields is to maintain the peripheral surfaces of the cores at ground potential so that the low pressure gas of relatively low dielectric strength which is contained in triangular or so-called filler spaces 7 between the cores and the sheath will likewise be subjected only to ground potential. In other words, the gas is protected from electrical stresses. This arrangement is important since it permits of the use of simple low resistance means freely to convey gas to and from the cable, thereby avoiding complicated and expensive devices which would be necessary if the gas had to be supplied to and received from the part of the conductor where the electrical stresses are high, as from a hollow core at the center thereof, for example. The conductors with their coverings are twisted together in the usual manner to form a cable. The valleys between the insulated and shielded conductors, and the inner wall of the sheath commonly referred to as filler spaces, are utilized as channels for the insulating gas. In these channels are flexible spirally wound elements 8 of suitable diameter having open spaces between turns through which gas is supplied to the interior of the sheath to act directly and radially on the insulation, the channels and the elements so arranged defining free unrestricted channels for the gas, and also means for conveying any excess compound to the sumps which will be referred to later. Desirably the channels and elements should offer only low resistance to the movements of the gas and compound. The elements may be made in any suitable way, as for example of thin metal coiled about an axis and resembling in appearance a long coiled spring. In addition to acting as free channels or conduits for the gas and compound, they support the sheath and assist in preserving the circular shape of the cable. The filler spaces in addition to containing the elements may, if of relatively large cross-section, also contain fillers made as usual of jute or equivalent material which also assist in preserving the circular shape of the cable, especially during the operations of reeling and unreeling. Desirably, the spaces mentioned would not contain fillers, thus aiding the free longitudinal movement of the gas and reducing cost. In some cases the spacer elements 8 mentioned may also be omitted, reducing the cost still more provided suitable channels for the gas are retained. The mechanical support they offer is not always necessary. The main thing is to have suitably unrestricted channels or spaces adequate to convey gas to every part of the insulation, and to permit the compound bleeding from the insulation to be carried to the sumps located at the joint casings. A binding band 9 is or may be employed to bind the parts in their proper positions.

The paper insulation is impregnated with a compound which is viscous and of good film tension and, hence, is held in the paper by capillary action and has little tendency to "bleed" even when subjected to the full load temperature of the cable. One important requirement for the impregnating compound is a minimum variation of viscosity with temperature change and an optimum average value of viscosity that reduces "bleeding" of compound into the gas channels to an acceptable degree, while at the same time allowing the channels to be readily cleaned of compound as desired. Another important requirement for the impregnating compound is that it shall have maximum stability in the presence of incipient ionization discharge since otherwise it would not give the necessary self healing effect, but instead would cause an excess of gas evolution and lead to an unstable condition. It has been found that over-refinement of the compound causes instability and is usually more pronounced in oils and compounds of paraffin base than those of naphthenic base. It is particularly important in the manufacture of the cable to carefully select an impregnating compound which shows maximum stability in the presence of ionization discharge.

Reference has been made to impregnating materials or compounds having certain specified characteristics. One suitable compound is composed of oil having a Saybolt viscosity of 5000 at 30° C. and 95 at 100° C. and a pour point or freezing point of minus 5° C. Such a compound is sufficiently thin to readily allow blowing out of surplus oil slugs that may be retained in the gas channels. However, in some cases it may be desirable to use a heavier compound of higher viscosity because it would be more readily held in the paper insulation by capillary action and would form thicker films of compound around the surface of the voids occurring in the paper. In other words, thicker films would materially reduce the maximum size of the voids. A suitable high viscosity compound comprises a mixture of oil and rosin in the proportion of 80% oil and 20% grade H rosin. Such a mixture has a Saybolt viscosity of 25,000 at 30° C. and 146 at 100° C. and has a pour point of plus 10° C. No effort is being made to exhaust the subject of suitable compounds but merely to indicate as examples compounds which in practice have been found to be suitable for the purposes hereof. As will be evident from the disclosure contained in this specification and briefly stated, the principal points to be considered are that the compound shall have (a) high stability in the presence of ionization discharge (b) such viscosity and film tension that it has little tendency to bleed from the paper when the cable is in service, (c) shall cause sufficient wax formation to substantially fill localized voids in the paper when and if incipient ionization discharge occurs, and (d) shall not unduly clog the gas channels.

It is desirable as some stage in the manufacture to extract as fully as possible air and other possibly harmful gases both from the paper insulation and the compound, the purpose being to eliminate as fully as possible the retention of undesirable gas in the form of bubbles within the insulation and the impregnant. For this purpose, I may use methods and apparatus now in use in well equipped cable factories, as for example, vacuum and $CO_2$ treatments.

After the cable cores are properly treated and impregnated as in a vacuum impregnating tank 35, Fig. 5, for example, the lead sheath 36 is applied by a suitable lead press 37 placed directly in front of the vacuum impregnating tank. Under the conditions specified, the cable will emerge from the press with the flexible tubes or elements defining the gas channels and the filler spaces partially filled, with air and possibly some compound. The next step is to free the tubes forming the gas channels and spaces of both air and compound. This may be done while the cable is still heated as it issues from the lead press by continuously blowing out the cable from the leading end to the lead press with a neutral gas, such as nitrogen or $CO_2$, for example. For this purpose, a cap 38 may be soldered or otherwise sealed to the sheath at the leading end through which gas at the necessary pressure is admitted by a pipe 39. The pressure may necessarily be higher than the operating pressure but this will not stretch the sheath because of the short time involved and because the cable and the flexible tubes are open at the lead press end.

Another suitable method of freeing the gas channels of air and compound and reducing to a minimum exposure of the impregnated insulation to air is to lift the reel of cable while still warm from the bath of impregnating compound and transfer it into a neutral gas filled enclosure 40, Fig. 6, where it should remain for a number of hours. This allows all surplus surface compound to drain off, including the compound in the channel spaces. The cable may then have the lead sheath applied directly thereto as it is received from the gas filled enclosure, the cable being fed to the lead press through a loose fitting gas filled packing sleeve 41. A slow, constant flow of neutral gas is desirably caused to pass from the packing sleeve into the lead press die block, thus surrounding the cable at all times with an atmosphere of neutral gas and thus prevent exposure to air. This may be done by admitting the gas to the tank by a supply pipe 42, from which tank it enters the sleeve.

To assist in keeping the channels free of compound, neutral gas may be blown through from a cap at the leading end of the sheathed cable as previously described.

Another method of freeing the gas channels of surplus compound is to draw the full length of cable directly from the lead sheath press into a straight and downwardly sloping steel pipe 43 as shown in Fig. 7, which is heat insulated and heated by steam or electricity. While the sheathed cable is sufficiently heated, the channels are blown free of compound in a down-hill direction by neutral gas under pressure, using for the purpose parts as described above.

The foregoing refers to operations related to vacuum drying and impregnating the cable lengths before applying the lead sheath. I may, if desired, dry and impregnate the cable lengths after applying the lead sheath. In that case, a length of sheathed cable will first be heated by placing it in a steam chamber 44, Fig. 8, for example. Vacuum will then be applied at one or both ends of the cable and after drying compound will be admitted and will flow along the feed channels until the entire cross-section is thoroughly impregnated. The excess compound in the channels will then be blown out with a neutral gas by any one of the methods previously described.

In Fig. 16 is shown other means for treating the cable during the manufacture thereof prior to the application of the sheath. In the figure, 60 indicates a sealed vacuum-impregnating tank, similar to 35, Fig. 5, and 61 a reel upon which cable 62 is wound. The reel is mounted on blocks 63 or other supports to raise it above the level of the bottom of the tank. Leads 64 of the cable extend through the cover of the tank to which a source of current is connected for heating the conductor during the impregnating and drying operations. The leads where they pass through the cover are provided with insulating bushings 65 which also prevent the entrance of air into the tank and the escape of gas therefrom. 66 indicates a pipe which is connected to a vacuum pump for the purpose of evacuating the chamber of the tank and removing air and moisture from the insulation on the conductor. 67 indicates a pipe for supplying nitrogen or equivalent gas to the tank. Heated compound is admitted to the tank by the pipe 68, and drained therefrom by the pipe 69. The tank is externally enclosed by a coil of pipe 70 to which steam is admitted by the pipe 71, and to which water may be admitted for cooling the tank at a later stage of operation. 72 indicates a pipe for draining steam or water from the coil. The insulation on the conductor is first heated and vacuum dried in the usual way, then the impregnating compound is admitted to the tank by the pipe 68, the outlet being closed. The impregnation takes place under heat and pressure. The next step is to drain the compound from the tank by closing pipe 68 and opening pipe 69. After the compound is drained, nitrogen or equivalent gas under pressure is admitted to the pipe 67, the admission of gas taking place while the compound is being drained. After the compound is drained to a point below the reel, excess compound is drained by gravity from the insulated conductor and the channels provided therein. During the drainage operation, the reel of cable is maintained at an elevated temperature, for example 65° C. This operation may take from 15 to 30 hours, depending upon the nature of the compound. Experience has demonstrated that under the conditions specified all of the surplus compound is drained off and that no slugs of compound remain in the channels of the cable after the lead sheath is applied. This is in spite of the fact that the channels and outer area of the cable cross-section are exposed to temperatures as high as 125° C. for a short time while the cable is passing through the lead press where the sheath is applied.

As a result of the drainage operation, such compound as is contained in the insulation is retained therein by capillary action and the surfaces of the insulation as well as of the tubes 8 are dry and clean. In other words, the drainage is so complete that there is no visible film of compound covering the surfaces, and the presence of compound in the insulation is scarcely noticeable even when subjected to rubbing action by the fingers. This kind of drainage is important because it prevents any substantial accumulation of compound in the continuous free feed gas channels even when the cable is fully loaded in service.

After the partially formed cable is impregnated and drained, it is removed from the tank 60 and transferred to the nitrogen containing chamber of a second tank immediately back of the press, as indicated in Figs. 6 or 7, for example. At the time of transfer of the cable and reel from one tank to another, the outer surfaces of the cable including the channel spaces have a dry clean appearance without noticeable traces of surplus compound.

During the early load cycles of the cable when in operation, a limited amount of the compound may ooze from the insulation and enter the gas channels. This will do no harm because the channels are purposely made somewhat larger than is necessary to convey the gas. One of the troubles incident to the use of solid type cable of the usual construction is that when the compound heats and expands, it stretches the sheaths and sometimes causes them to crack and when the compound contracts, moisture and other foreign matter is sucked into the cable.

With cable of my improved construction, expansion of the compound cannot affect the sheath because such expansion is taken care of by the gas channels which are capable of receiving without undue restriction or increase of pressure any compound which is forced radially out of the insulation, as for example through the perforations in the shields or between the butt spaces of the shields. Stated another way, the insulations are purposely left uncovered except for the perforated shields so that any expansion of the compound will cause it to ooze from the periphery of each core. A certain amount of migration and movement of the compound in service is accepted, and in fact it is desirable since it will "open up" the wall of dense paper insulation just sufficiently to allow radial transmission of gas pressure from the free feed gas channels. Tests have shown that what actually happens is that during the first few load cycles a certain amount of compound oozes from the wall of paper into the feed channels. The rate of oozing gradually decreases with each load cycle until finally a balance is reached when no further oozing takes place. All of the remaining compound is held in the paper by capillary action. Such compound as enters the free feed channels will not completely clog them but will gradually move to the joint casings which act as sumps for collecting and retaining it.

Desirably the cable length or a section comprising several connected lengths is laid on a slight incline as shown in Fig. 9, to facilitate the movement of the excess compound toward the joint casings 45 containing sufficient free space to form a sump or sumps. The cable may slope toward one sump or it may slope in opposite directions toward two sumps. Instead of utilizing the joint casings alone as the sumps with suitably controlled outlets therefor, a separate container such as 46 may be provided with a controlling valve 47 which permits the container to be removed and cleaned or another container applied without appreciable disturbance of the gas pressure condition within the cable. Where the joint casings also form the sumps, they will naturally be larger than where they serve only as coverings for the cable joints.

Another and important purpose in making the gas channels in the cable cross-section relatively large is that the gas which is ultimately supplied to and used in the cable during operation will, even with the low pressure applied, approximately 15 to 20 pounds per square inch, freely flow from end to end of the cable or within the section of a cable where the cable is segregated into sections by stop joints. Stated another way, the loss of gas pressure due to friction should be as low as possible because the applied pressure is initially low. By using low pressure, the auxiliary apparatus for supplying it becomes simple in the extreme, a sealed container for the purpose being sufficient, and thus expensive compressing apparatus along side of the cable is avoided.

In Fig. 2 is illustrated a cable system utilizing my invention. As an illustration but not as a limitation, the cable is intended for 10 to 35 kv. service. 10 indicates the cable, the reel lengths of which may be connected by straight joints 11 of ordinary suitable shielded construction located in chambered casings, or adjacent lengths may be connected by semi-stop joints 12 as, for example, of the type shown in Eby Patent 1,819,881, located in chambered casings. Such joints are useful in preventing free flow of gas from one length to another while not designed to positively prevent such flow. They are also useful during jointing operations.

A by-pass 13, Fig. 2, and valve 14 permit the gas channels of adjacent connected cable lengths to be in free communication or to be virtually separated as desired. Stop joints 15 located in suitable casings definitely prevent gas in the channels of one length or section from flowing into the channels of another length or section. Such joints may have a by-pass 16 in which are located valves 17 and 18. A tank 19 containing a supply of gas such as nitrogen, $CO_2$ or other neutral gas under approximately 15 to 20 pounds pressure is connected to the by-pass. The tanks may have fittings 19ª to facilitate filling and refilling. By opening valve 17, gas may be supplied to the left hand cable from the tank. By shutting this valve and opening valve 18, gas may be supplied to the right hand section. By opening both valves, both sections may be supplied. At the right of the figure is a stop joint 15, and gas under pressure is supplied independently to the connected lengths by the tanks 20 and 21 both containing gas under pressure. To the ends of the cable are attached suitable terminals 22, each comprising a body of insulation 23 through which the conductors extend to the top thereof and from which connections are made to station apparatus, to overhead lines or to other current carrying means.

The free gas channels freely terminate in the chambers of the joint casings whether the joints be of one kind or another. By reason of this arrangement, any compound which may ooze from the bodies of insulation on the conductors enters the channels and ultimately moves or slowly flows toward the gas filled chambers of the joint casings where it is collected and retained in the sumps associated therewith. In this manner, the gas channels are kept free of compound which otherwise might tend to clog them. By maintaining the channels free of obstruction, the outstanding advantage is obtained that low pressure gas may effectively be used. From the foregoing, it will be seen that the sheath will normally contain little or no free compound. Because of the relatively large diameter of the joint casing and because they are commonly made of lead, it is desirable to wrap them externally with a thin metal band which is generally similar to the binding band 9 of Fig. 1.

Under some conditions in the field, the profile of the cable run may be such that natural drainage of surplus compound in the feed channels towards the sumps at the joints may not be realized at all points along the line. For instance, short dips in the cable run may be necessary to get under obstructions, such as sewer pipes. The channels in these dips will, at first, gradually fill up with surplus compound. During this period of time, it may be advisable to periodically blow the dips free of surplus compound by application of higher gas pressure on one side with reduced gas pressure on the opposite side. This will only be necessary during the first few months of operation before the cable has fully "settled down." If there is free gas feed on both sides of such a dip from suitable tanks such as 20 and 21, this periodic blowing out will not prove necessary, since clogging of the channels at one point only is not objectionable.

The terminals are desirably of special construction in which the filling material for the chamber of the insulator part 22 is separately maintained from the impregnating material and the gas of the cable. The reason for this is that the terminals are above the level of the cable and and fluid therein would tend to flow into the cable by gravity at operating temperatures. Also, because the gas alone at the pressure employed has only limited dielectric strength in large space volumes such as exist in a terminal. The gas at the low pressure employed has ample dielectric strength to prevent ionization discharge in small voids such as exist in the cable insulation but not in large gas spaces. This explains why the insulated conductors of the cable have metallic ground shields and the gas feed channels thereby maintained at ground potential. Without the filling material for the terminal, there would be a discharge in the relatively large gas spaces of these terminals. It also explains the necessity of shielding the large gas spaces in the joint casings where the electrical stresses are also relatively high. This may be done by the use of perforated shielding tape of the character shown in Fig. 1 located between the insulated conductor joint and the casings. In the terminals, the electrical stresses are not so high, and since complete shielding of the large gas spaces is not possible, there remains two suitable alternatives. The first is to fill the empty spaces in the terminal with neutral gas under the same pressure as in the cable and depend upon the lower stresses to prevent discharge in these gas spaces. The second and previously mentioned method, to be used when greater electrical strength is desired, is to fill these spaces with viscous compound to the exclusion of gas filling. To accomplish the desired end, a construction such as shown in Fig. 13 may be employed. The insulators 23ª are mounted on a chambered metallic member 50 which in turn is mounted on a chambered base member 50ª in which is located a so-called semi-stop assembly comprising a compressible packing element 51 through which the conductor or conductors extend. This shuts off direct communication between the gas in the cable and the filling compound in the chamber of the insulator. The semi-stop is subjected on the under side to the gas pressure within the cable and on the upper side is exposed to the compound used to fill the chambers in the hollow insulators 23ª. The gas pressure plus the high resistance offered by the semi-stop will prevent the loss of compound from the terminal. For the compound, it is desirable to use a viscous compound such as petrolatum, although a more solid compound can be used, if desired. The construction will allow the transmission of sufficient gas pressure through the semi-stop to maintain the whole terminal under positive pressure. Fig. 2, part 12, illustrates a semi-stop joint, previously described. One of the chief functions of the semi-stop at each end of the joint casing is to prevent excessive loss of gas during joint construction. Such semi-stop joints represent additional cost. A simpler and cheaper means for temporarily shutting off the outward flow or escape of gas during the jointing of the cable lengths in the field is to use ordinary normal joints 11, Fig. 2, and employ temporary plugs as illustrated on an enlarged scale in Figs. 10, 10ª, 11 and 11ª. The means comprise temporary plugs adapted forcibly to be inserted in the ends of filler space openings in the cable ends and are subsequently removed to establish through connections between cable lengths. The temporary plugs may be removed by hand before the joint casing is applied, or they may each be provided with a wire or cord 47 fastened thereto, the wire or cord extending outwardly through any one of the usual openings in the casing and through which the temporary plugs may be removed. The casing openings are normally closed by screw threaded gasketed plugs. This arrangement results in a saving of gas.

The temporary plugs should be soft and pliable and may be preformed to snugly fit into the irregularly shaped filler spaces in the center between conductors as well as between the conductors and sheath. The plugs should be more or less impervious to gas escape. For example, they may be made of impregnated felt or wool 48 either with or without a supporting core 49. Or, I may use soft treated cotton cord packed or rammed into the filler spaces or channels and subsequently removed by pulling on the outer end of a cord, similar to cord 47, which is long enough to extend through a small opening in the casing. However the plug is formed, it should hold itself in the filler space against the gas pressure. The gas pressure may be maintained at full working pressure if the temporary plugs are tightly seated or the gas pressure may be temporarily reduced. The minimum pressure is desirably greater than atmospheric so as to prevent the entrance of air and moisture. In this connection, it should be remembered that at some stage in the manufacture the insulation and the compound within the cable sheath have been degasified which renders them more susceptible to the objectionable action of air and moisture. Where the gas channels contain metal elements, such as 8, the action of inserting the plugs may compress them endwise which is permitted by the spaces between turns, or a short length may be pulled out and then cut off and pushed back beyond the edge of the lead sheath to afford the necessary space.

In Fig. 3 is illustrated two lengths 10 of cable which have been laid ready for jointing. The outer ends of the lengths have caps 24 sealed to the sheath, and to each is connected a tank 25 containing neutral gas in sufficient amount and under sufficient positive pressure to feed gas through the channel or channels toward the joint to prevent the entrance of foreign matter during the jointing operations, subject to the control of valves 26. To prevent escape of gas through the channels during such operations, the temporary plugs already described are inserted in the filler spaces at the cable ends. The adjacent ends of the conductors will be united in the usual way by connectors after which reinforcement insulating tapings and metal tape shields will be applied and finally a casing 27, shown in dotted lines, will be sealed at its ends to the sheaths. Additional lengths will be connected in a similar manner, each added length having its own temporary gas tank. Gas under pressure for the connected lengths may be supplied from the tank at one end or additional tanks may be provided and connected to intermediate joint casings where the line is of substantial length.

In Fig. 4 is shown a cable having a single stranded conductor 28 surrounded by a body of insulation 29 such as paper, and an enclosing lead sheath 30. Between the insulation and the inner wall of the sheath is a longitudinally extending free gas channel 31 of annular form. The channel is formed, for example, by winding on the insulation a thin metal strip 32 having numerous projections 32ª that engage the inner wall of the sheath and hence are at ground potential. The tape may be perforated or not as desired, but if not perforated sufficient space should be left between turns to permit the compound to ooze from the insulation under the conditions previously stated. By this or equivalent arrangement, the filling of low pressure gas contained in the annular channel space is protected from electrical stresses and is subjected only to ground potential. The arrangement of the joints, reservoirs or tanks, etc. will generally be similar to that shown in Fig. 2 and needs no further description.

Reference has been made to treating and impregnating the insulation before the cable is sheathed and while this procedure is generally the best for the purpose, I may under certain circumstances pretreat the paper with a suitable viscous compound that has little or no tendency to migrate due to surface tension and apply it in this condition to the conductor.

In Fig. 12 is a curve based on tests of my improved cable illustrating voltage stress at which ionization starts as a function of gas pressure in voids of impregnated paper insulated cable after all compound possible has been drained into the gas feed channels by application of load cycle heating from 25° C. to 80° C. If this cable were operated as an ordinary solid type cable, ionization would start at a voltage stress of about 20 volts per mil while the cable is under negative pressure and cold. It will be noted that when the gas pressure is increased to 15 pounds, the voltage at which ionization takes place is increased from 20 to 85 volts per mil, representing more than a fourfold increase in voltage.

If the gas pressure were increased to 200 pounds, it will be noted that the ionization voltage would only be increased to 162 volts per mil which is less than twice the allowable voltage stress at 15 pounds, and such an increase can only be obtained at an excessive cost in the way of special apparatus. The general shape of the curve shows a very steep increase in ionization voltage up to about 20 pounds pressure. Beyond this the increase is much less pronounced and the curve much flatter. Ordinary lead sheath can without difficulty be operated up to about 15 pounds internal pressure. From 15 to about 50 pounds pressure, it is necessary to use reinforcement such as a double sheath with a binding band between sheaths. Even this would appreciably increase the cost of the cable as compared with the additional benefit derived from increased pressure. From 50 to 200 pounds gas pressure, it is necessary to use a steel pipe envelope, and this further increases cost and complications with still further decrease in benefit derived. This explains why the low pressure gas cable of my invention for moderate voltage use is more economical and feasible than high pressure gas cable for very high voltage use.

Fig. 14 is illustrative of the self-healing effect of ionization. This figure is a chart record of a load cycle voltage test on a three-conductor low gas pressure cable embodying my invention. The test was run for forty-eight consecutive weeks under a nitrogen gas pressure of 10 pounds, although the cable was under test for a considerably longer time. Dielectric power factor measurements, as previously indicated, show the condition of the insulation within the sheath and constitute the established practice among cable engineers and users of cable in making such investigations. Such power factor measurements were made periodically during the load cycle test as indicated on the chart. Ionization is represented by the difference between the power factor at 50 volts per mil and at higher voltage stressing, such as 75 and 85 volts per mil. The measurements were made at 25° and 80° C. representing the minimum and maximum temperatures of the daily load cycles. It will be noted from the chart that ionization was quite pronounced at the beginning of the life run at 75 volts per mil and that after about 15 weeks of time ionization had practically disappeared due to the self healing effect previously mentioned. At the end of 21 week, the voltage on the cable was increased to 85 volts per mil, and it will be noted that ionization again became pronounced and finally disappeared at about the 30th week due to the self-healing action. It will be noticed from Fig. 14 that there is no pronounced increase in power factor with time, but instead the power factor either remains stable or gradually decreases. This means that there was no deterioration of the insulation during the life run.

Examination of the above referred to lengths of cable after the tests shows "X" wax formation in the butt spaces between paper tapes in proximity to the gas feed channels. No wax was found elsewhere through the insulation cross-section, and this tends to prove that only the larger butt spaces near the feed channels were drained of compound, the compound being held in the paper by capillary action. This was further confirmed by the surplus compound found in the paper when the cables were dissected. The ionization shown by the chart of Fig. 14 occurred in the butt spaces and gradually disappeared as "X" wax was formed in these locations because the wax has a tendency to fill up the spaces and make the voids sufficiently small to extinguish ionization at that particular gas pressure and voltage stress.

Cables of the character described herein have been sold to the Consolidated Edison Company of New York, Inc. and are now being installed.

Two of the chief difficulties with existing cables of the prior type previously mentioned comprising a lead sheathed cable located inside of a steel pipe containing gas under pressure of the order of 200 pounds per square inch are (a) the difficulty of initially making the pipe tight enough to prevent leakage of gas and (b) the difficulty of locating leaks from the pipe when they occur, especially where the pipe is buried directly in the ground. Experience has demonstrated that cable filled with thin oil under relatively low super-atmospheric pressure and with an ordinary lead sheath can be successfully maintained fluid tight when due care is exercised in making the joints. Such leakages as have been encountered are usually found at the joint casings in the manholes where they are readily detected and easily repaired. My improved cable utilizing as it does relatively low pressure gas is comparable, as regards fluid tightness of the installed system, with oil filled cable.

In case of leakage in an installation involving my improved cable, the first thing to do would be to measure gas pressure at each joint along that section of the line where the leak is supposed to exist. If the leakage is of sufficient volume, the flow of gas through the channels of the cable will cause a pressure drop, and the point of leakage can at least be approximately located in this way. The reservoirs or tanks can be shut off during this operation. Reduction of gas volume within the cable system will increase the pressure change.

In some cases of service, the pressure drop method outline above may be sufficiently accurate, particularly if mercury U-tubes are used instead of ordinary pressure gauges. However, if compound slugs exist in the gas channels for reasons previously mentioned, they would probably interfere and allow only an approximate location by the pressure drop method, especially where the gas leak is relatively small.

A more exact method of determining the exact location of the leak may be accomplished by a small and simple portable gas analyzer. The analyzer may be used to measure samples of the atmosphere in the suspected manhole or duct, and may be of the type showing low oxygen content in the sampled atmosphere or of the type showing abnormally high nitrogen content. Such analyzers are in common use and hence do not require specific description.

If the leakage happens to be directly in the manhole due, for example, to a faulty wiped joint between the joint casing and the cable sheaths, a sample of the manhole atmosphere will indicate such leakage. If the leakage is due to a defective sheath within a duct, it can be detected by inserting a rubber hose a suitable distance into the duct containing the cable and through it a simple of the duct atmosphere obtained. The gas leakage within a given duct may also be determined by the use of a differential analyzer of ordinary construction to which gas from the duct in which leakage is known to be present and also the atmosphere from an adjacent duct where leakage does not exist is introduced, the samples to be obtained as nearly simultaneously as possible.

Mention has been made of the use of nitrogen as a suitable gas, the reason being that tests have shown that it works well for the purpose because of its low volumetric solubility in the compound, its chemical neutrality, and its relatively high dielectric strength, but it is not to be understood hereby that other gases having the desired qualities are to be excluded.

After the manufacture of the cable is completed and the free feed channels filled with neutral gas to a few pounds above atmospheric pressure, for example, 5 to 15 pounds gauge, the ends are sealed, and the cable length shipped to the customer on a reel. By sealing the ends of the cable, the positive pressure within it is maintained until ready for use. By using a lead sheath of ordinary construction, the cable can be reeled and unreeled ready for use in the same manner as ordinary solid type cable which is a distinct advantage.

When the cable has been pulled into ducts, as usually would be the case, or laid in a trench, if it be so desired, the ends are opened up, simultaneously or successively, and a controllable source of gas supply connected to the end of the length remote from the manhole where the jointing is to take place. During the jointing operations when the temporary plugs are not in place, a low positive flow of gas through the cable lengths should be maintained to prevent the entrance of air and other foreign matter. During those jointing operations when the temporary plugs are in place, a low positive gas pressure should be maintained for the same purpose. After all of the joints have been made and accessories connected and before putting the cable into operation, the gas pressure within the cable is adjusted to a predetermined value depending upon the temperature of the cable at the time the adjustment is made, and the average gas pressure as well as the minimum and maximum gas pressure limits required for operation. These adjustments may be made through the reservoirs. Complete control of pressure under all conditions of operation is thereby obtained. The gas pressures should never be allowed to drop below a specified minimum pressure, say of the order of 5 to 10 pounds per square inch. This gives assurance that harmful ionization discharges will never occur. Likewise, to prevent damage to the single lead sheath without reinforcement, the pressure will never be allowed to exceed a maximum value in the order of 15 to 20 pounds. This predetermined pressure range control throughout the entire length of cable line is a vital part of the present invention and assures successful operation of the cable.

The pressure control is obtained not only by utilizing free movement of gas in longitudinal feed channels but by having a predetermined total gas volume space in the cable system, as related to the required working temperature range of the cable and to its cross-sectional size. A large cable and a wide working temperature range requires a relatively large total gas volume to keep the gas pressure within desired limits. On the other hand, a small cable and a narrow working temperature range requires only a relatively small total gas volume in the system. This total gas volume consists of the gas spaces in the cable feed channels, the joint casings and the gas reservoirs. Under favorable conditions, the gas volume represented by the feed channels and the joint casings may prove sufficient, particularly if the joint casings are purposely made larger than usual. Under these favorable conditions, auxiliary gas reservoirs may not be required to assist in keeping the gas pressure within desired limits. Under less favorable conditions, gas reservoirs will be required and the total gas volume of these reservoirs will be determined by the required pressure range control.

When auxiliary gas reservoirs are required, the total capacity can be concentrated at one or more points along the cable line. It is better, however, to divide the reservoir capacity into smaller units and distribute these more or less uniformly along the line. This gives better assurance of uniformly maintained pressure control.

Fig. 15 illustrates how the working pressure range can be controlled in a typical cable system by adding auxiliary gas reservoir capacity. In this particular case, it is desired that the minimum pressure under no load, winter temperature conditions should not be less than 10 pounds per square inch and the maximum pressure under full load summer temperature conditions should not be more than 15 pounds. From Fig. 15, it is seen that an auxiliary gas reservoir capacity of 25 gallons per 1000 feet of cable would give this required range of pressure control.

In some circumstances, high pressure gas cylinders, similar to those in which the gas is shipped, will be utilized for gas supply and gas pressure control during installation and service. These gas cylinders will have automatic reducing valves for reducing the gas pressure to the desired low value. As a precaution, relief valves set slightly above the low working pressure would also be connected to the cable system.

It has been previously stated that reinforcement of the sheath is unnecessary on account of the low pressure employed. However, where somewhat higher gas pressures are found to be desirable for special applications, it may be desirable to reinforce the sheath, and this may be done in any of the well known ways.

In view of the foregoing disclosures as to methods which may be employed in the manufacture of my improved cable, it is evident that the sequence of the various steps may be varied as best suited to the requirements of the cable involved, and to the simplification of the manufacture of the cable.

The means for closing the ends of the free feed gas channel in a gas filled cable, including the method of jointing reel lengths of such cable, are not claimed herein since such means and method form the subject matter of my divisional application Serial No. 316,531 filed January 31, 1940.

The structure of the gas filled cable disclosed is not claimed herein as it forms the subject matter of my divisional application Serial No. 333,181 filed May 3, 1940.

The structure of the terminals herein disclosed is not claimed herein as it forms the subject matter of my divisional application Serial No. 334,630 filed May 11, 1940.

What I claim as new and desire to secure by Letters Patent of the United States, is:

1. The method of making a cable having a conductor covered with fibrous insulation and a normally open gas conveying channel extending longitudinally of the conductor which comprises impregnating the insulation with liquid compound and also admitting the compound to the channel, applying an impermeable sheath around the insulated conductor and the gas channel, and then blowing the compound out of the channel with a neutral gas under positive pressure.

2. The method of making a cable having a conductor covered with fibrous insulation and a normally open gas conveying channel extending longitudinally of the conductor which comprises submerging the insulated conductor in a sealed tank containing liquid impregnating compound and a body of neutral gas above the compound, removing the insulated conductor from the compound and inserting it into a body of neutral gas to permit excess compound to drain therefrom, applying an impermeable sheath around the insulated conductor without exposing it to air, and then blowing the compound out of the channel with a neutral gas.

3. The method of making a cable having a conductor covered with fibrous insulation and a sheath-supporting hollow perforated element extending longitudinally of the conductor which comprises introducing the partly formed cable into a sealed tank, removing air and other impurities from the conductor insulation and hollow element, introducing sufficient liquid impregnating material to submerge the partly formed cable while maintaining the tank and its contents at an elevated temperature, draining the impregnating material from the tank and said cable, maintaining the tank filled with a neutral gas while the impregnating material drains from the insulation and the element, and applying a metallic sheath over the insulated conductor and the perforated element after excess material has been drained off.

4. Steps in the manufacture of cable having insulated conductors and normally free gas feed channels, which comprise impregnating the insulation while in a tank with a heated compound, transferring the partly formed cable from the first tank to a second sealed tank filled with a neutral gas under positive pressure and permitting excess compound to drain from the insulation and the channels, and feeding the partly formed cable from the second tank through a gas sealed outlet directly into a lead press for sheathing it.

5. The method of making and operating a multi-conductor electric cable which comprises individually covering the conductors with a dense body of thin paper tape with the turns thereof in abutting relation to prevent localized ionizable voids, assembling the individual conductors to form a cable, submerging the insulated conductors in a heated body of viscous liquid compound in a vacuum tank, draining from the insulation that portion of the hot compound not held therein by capillary action while protected from atmospheric air, applying an impervious metal sheath around the conductors in a manner to define parts of angularly spaced free feed channels located between the inner wall of the sheath and the several conductor coverings, the channels extending from end to end of the conductors, supplying current of moderate potential to the conductors which tend to cause incipient ionization in localized voids present in the bodies of insulation with the result of causing wax formation in the region of the so ionized voids, and maintaining the free feed channels filled with an insulating gas under positive pressure which acting on the wax causes it to heal the voids and prevent cumulative ionization discharges.

6. Steps in the manufacture of cable comprising inserting the insulated conductor in a tank, removing air and other harmful gas and moisture from the tank and insulation, filling the tank with a suitable impregnating compound, subjecting the tank and cable during impregnation to neutral gas under positive pressure, heating the conductor and insulation, draining the compound from the insulation when so heated until the exposed surface of the insulation is dry, transferring the conductor from the first tank to a second tank containing gas under positive pressure, passing the insulated conductor through a press and applying a sheath thereto in such manner as to provide a continuous longitudinal channel therein formed in part by the sheath and the remainder by the insulation, and finally filling the cable with a selected neutral gas under positive pressure.

7. The method of making and operating an electric cable in which cumulative ionization discharges tend to take place, which comprises covering the conductor with a dense body of insulation, removing air and moisture from the insulation, heating the conductor and insulation and while so heated impregnating the insulation with a heated viscous compound which retains its liquid form and has little tendency to flow during operation of the cable, removing excess compound from the insulation while it and the compound are heated until the surface thereof is dry, enclosing the so insulated conductor in an impervious metal sheath in a manner to define between it and the insulation a longitudinally extending continuously open channel, and filling and maintaining in the channel an insulating gas under controlled positive pressure which when incipient ionization occurs in a localized void at the operating potential of the conductor acts with the compound to heal the void where the incipient ionization started and thus prevent subsequent cumulative damage.

8. The method of making an electric cable which is self healing as regards incipient ionization due to void formation which comprises covering the conductor with permeable paper insulation initially containing voids, impregnating the insulation with an oil compound of high stability in the presence of ionization discharges, having a Saybolt viscosity of the order of 95 at 100° C., removing such compound from the insulation except that contained in the paper structure, wrapping the insulation with an electrostatic shield making electrical contact with the sheath, applying an impervious metal sheath over the insulated conductor and shield in a manner to form a continuous well defined longitudinal channel between the sheath and the conductor covering, the channel being at ground potential, and maintaining the channel filled with controlled low positive pressure gas whereby wax formed by the compound due to incipient ionization discharges in the region of the localized voids in the insulation is caused to heal the same and prevent cumulative ionization discharge.

9. The method of making and operating an electric cable which is self-healing as regards incipient ionization due to void formation which comprises covering the conductor with permeable insulation initially containing small voids, impregnating the insulation with a liquid compound, havng high viscosity and high stability in the presence of ionization discharges, and comprising a mixture of oil and rosin of the order of 80% oil and 20% rosin having a Saybolt viscosity of the order of 25,000 at 30° C. and 146 at 100° C. and a pour point of plus 10° C., draining compound from the insulation except that contained in the paper structure, applying an imprevious metal sheath over the insulated conductor in a manner to form continuous well defined longitudinal channel between the sheath and conductor covering, and maintaining the channel filled with low positive pressure gas whereby wax formed by the compound due to incipient ionization discharges in the localized voids in the insulation is caused to heal the same and prevent cumulative ionization discharges.

10. Intermediate steps in the manufacture of a self-healing gas filled cable of the type having an insulated conductor and a continuous free feed gas conveying channel co-extensive in length with that of the conductor comprising subjecting the insulation and the channel to a flood of impregnating liquid and then draining the channel and the insulation of liquid until the surface of the insulation and channel are dry.

11. Steps in the manufacture of cable having conductor means covered with liquid impregnated dense insulation which comprises feeding the insulated conductor means through a heated press to apply thereto an impervious enclosing sheath in a manner to form a continuous longitudinally extending open channel located between it and the insulation, sealing the end of the sheath issuing from the press with a cap, and continuously supplying gas under pressure to the channel through the sealing cap as the cable moves outwardly from the press for blowing any liquid contained in the channel through the unsheathed portion of the cable on the entrance side of the press.

12. Steps in the manufacture of a cable of the type having a liquid impregnated insulated conductor, and a normally free gas feed channel extending from end to end of the cable, which comprises feeding the partially formed cable through a sheath applying press in a manner to cause the sheath to enclose the conductors and form the outer wall of the gas feed channel, feeding the cable as it emerges from the press into a downwardly inclined heated container, capping the end of the cable having the greater elevation to seal it while leaving the lower end open, admitting a neutral gas under pressure to the channels to blow out through the open end thereof any liquid contained therein, and finally sealing the open end of the sheath to prevent the admission of foreign matter thereto.

13. The method of making and operating a cable which comprises covering a conductor with a body of dense permeable insulation without intentional spaces therein, impregnating the insulation after its application to the conductor with a liquid impregnant of a character having high stability in the presence of ionization discharge and little tendency to ooze from the insulation under operating load conditions, draining the insulation of impregnant until the outer surface thereof is dry, applying an impervious sheath over the insulated conductor in a manner to define between its inner wall and the conductor covering a continuous lengthwise extending open channel containing sufficient gas to permit expansion of the compound without appreciable increase of gas pressure, the channel serving freely to convey gas to the insulation and also receive and convey lengthwise of the cable liquid that may ooze into it from the insulation under operating load conditions, and filling the channel with an insulating gas under controlled positive pressure whereby the gas and liquid acting jointly during operating conditions of the cable will cause healing by wax formation of voids in the insulation in which incipient ionization has taken place.

14. Steps in the manufacture of cable comprising covering a conductor with a dense body of permeable insulation, heating the conductor and body, impregnating the body with a heated liquid having high stability in the presence of ionization discharge, draining such liquid from the insulation as is not retained therein by capillary action until the peripheral surface of the body is dry, passing the drained insulated conductor through a press heated to a temperature above the impregnating temperature and applying thereto an impervious sheath in a manner to enclose the insulated conductor and to define between it and the insulation a continuous longitudinal channel from which gas has free access to the insulation, removing from the enclosing sheath such liquid as may have oozed from the insulation and collected in the channel during its passage through the press, and thereafter filling the sheath and channel with a neutral insulating gas and retaining it therein under positive pressure.

15. Steps in the manufacture of cable comprising inserting the insulated conductor in a sealed tank, removing air and other harmful gas and moisture from the tank and insulation, filling the tank with a suitable impregnating liquid compound, subjecting the tank and its contents to neutral gas under positive pressure, heating the tank and its contents, draining the compound from the insulation when so heated until the exposed surface of the insulation is dry, transferring the conductor from the first tank to a second tank containing a neutral gas under positive pressure, passing the insulated conductor through a press and applying a sheath thereto in such manner as to provide a well defined continuous longitudinal channel formed in part by the sheath and the remainder by the insulation, and finally filling the cable with a selected neutral gas under positive pressure.

16. Steps in the manufacture of electric power cable comprising wrapping the conductor means with layers of pervious paper tapes with adjacent edges of the tape in each layer in abutting relation to reduce formation of spaces therebetween, wrapping the paper with electrostatic shielding means, impregnating the paper after the wrapping operations with a liquid which retains its liquid characteristics under all operating conditions and has high stability in the presence of ionization discharges, heating said parts and while so heated draining liquid from the parts until the surfaces thereof are dry, enclosing the insulation and shielding means in a metallic sheath in a manner to define between its inner wall and the wrappings a continuous longitudinally extending open ended channel of sufficient cross-section to contain sufficient gas to permit expansion of the compound without appreciable increase of gas pressure and freely to convey gas to the insulation and also to receive and convey longitudinally of the cable such liquid as may ooze into it from the paper during load cycles, the channel operating at ground potential, and filling the channel with an insulating gas under relatively low positive pressure from which it has access to the insulation.

17. The method of making a cable having a conductor covered with fibrous insulation and a continuous gas conveying channel located outside of the insulation and extending longitudinally of the conductor which comprises submerging the insulated conductor in a sealed tank containing viscous liquid impregnating compound with a body of neutral gas under positive pressure above the compound, heating the conductor and compound, removing the conductor from the compound and while heated permitting the compound to drain from the insulation and also from the channel until the exposed surfaces thereof are dry, and applying an impermeable sheath around the insulated conductor in a manner to define a wall of the channel.

18. The method of making and operating a multi-conductor electric cable which comprises individually covering each of the conductors with a dense body of thin paper tape with the edges of the turns thereof in abutting relation to reduce localized ionizable voids therebetween, assembling the individual conductors to form a cable, submerging the insulated conductors in a heated body of viscous liquid compound in a sealed tank, draining from the paper that portion of the hot compound not contained within the paper structure, applying an impervious metal sheath around the conductors in a manner to define parts of angularly spaced continuous feed channels located between the inner wall of the sheath and the several conductor coverings, the channels extending from end to end of the conductors, supplying current to the conductors at a potential which tends to cause incipient ionization in localized voids present in the bodies of insulation, and maintaining the feed channels filled with an insulating gas under positive controlled pressure to cause the compound and gas to jointly act to heal the voids and prevent cumulative ionization discharges.

GEORGE B. SHANKLIN.

CERTIFICATE OF CORRECTION.

Patent No. 2,253,984. August 26, 1941.

GEORGE B. SHANKLIN.

It is hereby certified that error appears in the printed specification of the above numbered patent requiring correction as follows: Page 4, first column, line 67, for "as some" read --at some--; page 8, first column, line 35, for "15 weeks" read --14 weeks--; line 38, for "week" read --weeks--; same page, second column, line 57, for "simple" read --sample--; page 10, second column, line 58, claim 9, for "havng" read --having--; line 65, same claim, for "imprevious" read --impervious--; and that the said Letters Patent should be read with this correction therein that the same may conform to the record of the case in the Patent Office.

Signed and sealed this 14th day of October, A. D. 1941.

Henry Van Arsdale,
Acting Commissioner of Patents.